Sept. 14, 1954   J. B. GODSHALK ET AL   2,689,322
METHOD AND APPARATUS FOR TREATING BATTERIES
Filed May 21, 1951   2 Sheets-Sheet 1
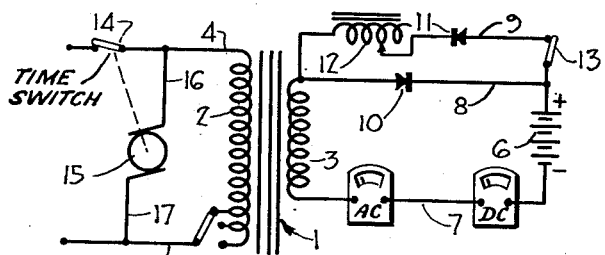
FIG. 6
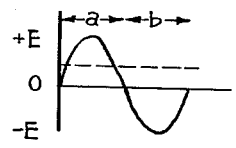
FIG. 1
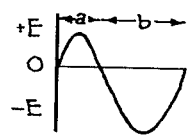
FIG. 2
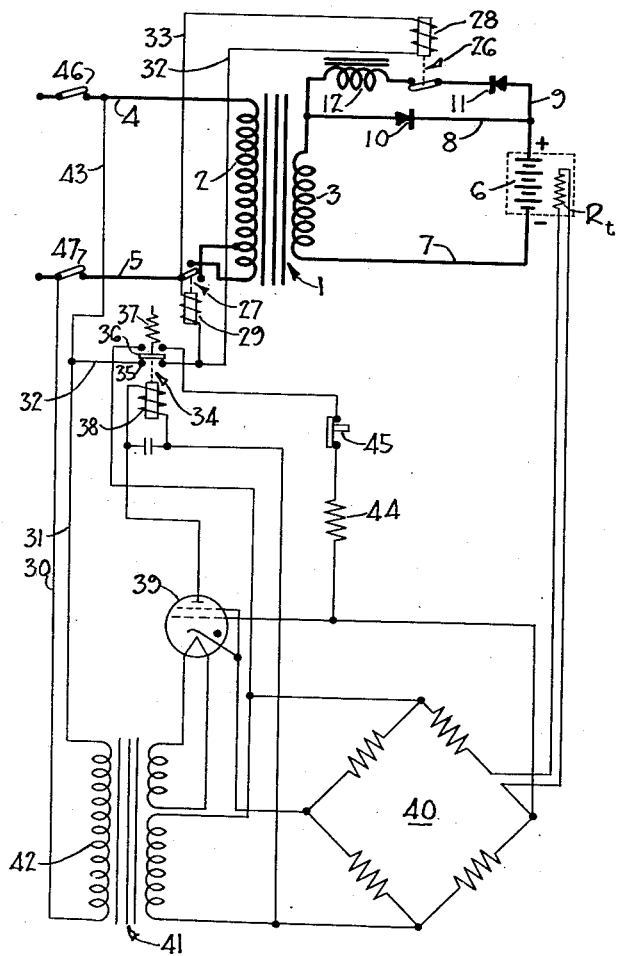
FIG. 8
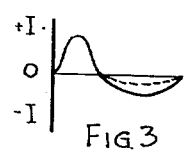
FIG. 3
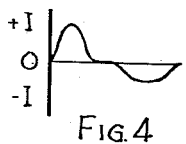
FIG. 4
PER-JUNCTION RESISTANCE
OF 11, FIG. 6ª, APPROX. ⅓
THAT OF 10.
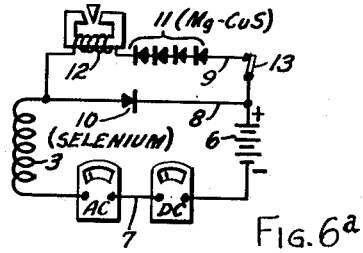
FIG. 6ª
INVENTORS
JAMES B. GODSHALK
LEWIS A. MEDLAR
BY Stone, Boyden & Mack,
ATTORNEYS Sept. 14, 1954   J. B. GODSHALK ET AL   2,689,322
METHOD AND APPARATUS FOR TREATING BATTERIES
Filed May 21, 1951   2 Sheets-Sheet 2
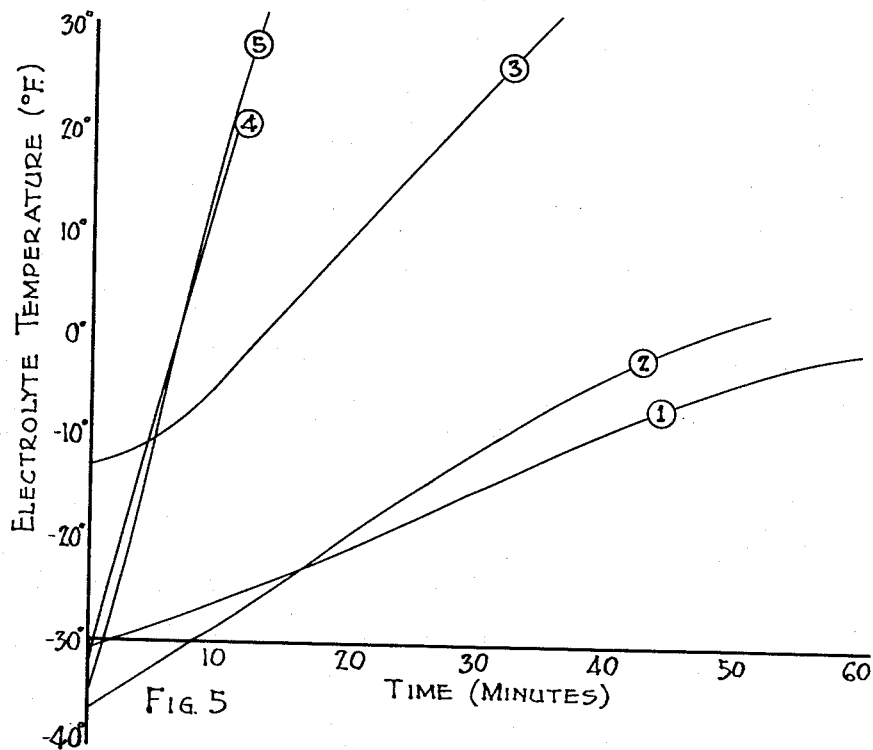
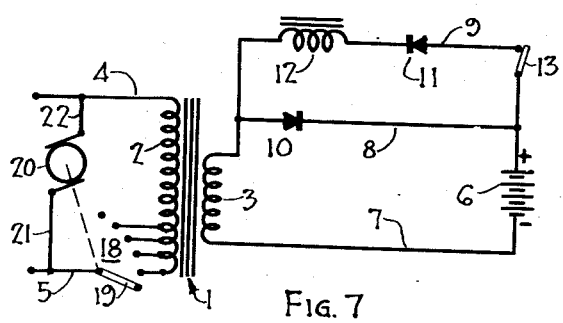
INVENTORS
JAMES B. GODSHALK
LEWIS A. MEDLAR
BY Stone, Boyden Mack,
ATTORNEYS.

Patented Sept. 14, 1954

2,689,322

UNITED STATES PATENT OFFICE 2,689,322

METHOD AND APPARATUS FOR TREATING BATTERIES

James B. Godshalk, Philadelphia, and Lewis A. Medlar, Oreland, Pa., assignors, by mesne assignments, to Fox Products Company, Philadelphia, Pa., a corporation of Pennsylvania Application May 21, 1951, Serial No. 227,416

19 Claims. (Cl. 320—2)

This invention relates generally to the treatment of electrical batteries and particularly to methods and apparatus for heating and, in some instances, heating and charging, exceptionally cold batteries.

At very low temperatures, on the order of —5° F. for dry batteries and —60° F. for storage batteries, electrical batteries are either unserviceable or soon become so. Further, in the case of storage batteries, normal operation is impossible at temperatures materially below 0° F. When ordinary automotive type lead-acid storage batteries, for example, are subjected to temperatures below 0° F., the battery electrolyte begins to freeze, the precise freezing point depending upon the specific gravity of the electrolyte and thus upon the state of charge of the battery. Freezing takes place progressively, crystals of water ice separating out from the electrolyte and the electrolyte thus becoming progressively more concentrated. If the battery is substantially discharged, the electrolyte may freeze solid, the plates then being irreparably damaged. If the battery has a fair degree of charge, or is fully charged, any ice which forms will be in the form of slush.

Even when the state of charge of a storage battery is sufficiently high to prevent the electrolyte from freezing at unusually low temperatures, the battery still cannot deliver current normally. One reason for this is because the resistance of the electrolyte varies inversely as its temperature, so that an unusually cold storage battery has a very high internal resistance. Another reason is that, as the temperature of the battery decreases, the viscosity of the electrolyte increases, until at —60° F. the viscosity of the electrolyte is as much as 28 times normal viscosity at room temperature. Such high electrolyte viscosity seriously limits the rate at which the ions of the electrolyte can migrate into the pores of the battery plates to replace the ions removed in discharge of the battery. This results in an effective high polarization of the battery, greatly reducing its output.

Besides increasing the effective resistance of the battery, the increase of viscosity of the electrolyte at low temperatures has the further and more serious effect of preventing charging of the battery. When the battery is very cold, even a very small charging current, on the order of one ampere or less, will result in gassing. This is apparently because, due to the high electrolyte resistance and the exhaustion of ions at the plate surface, the potential across the battery rises very quickly to the polarization point, with the result that the effect of the charging current is to disassociate the water molecules of the electrolyte rather than to charge the battery. Also, since the cold electrolyte is viscous, the resulting gas bubbles cannot escape freely through the electrolyte, and the electrolyte froths or boils very quickly. At temperatures on the order of 0° F. and lower, it appears that a storage battery will accept substantially no charge electrochemically, and, in any event, gassing takes place so quickly as to make any attempt at charging impractical.

There are now available special storage batteries designed particularly for low temperature use. These "cold weather" batteries include special plates which are more porous than the plates of conventional storage batteries and this increased porosity tends to offset the effects of the increased electrolyte viscosity at low temperatures. But such special batteries actually have not solved the problem, since they are quickly discharged in use to a point where the electrolyte will freeze. It is thus clear that some satisfactory means of heating even the special "cold weather" storage batteries, as well as conventional storage batteries and dry cells, is needed if such batteries are to be used in especially cold environments. This need is particularly felt, of course, in cases of military field operation.

Various attempts have been made in the past to overcome these difficulties. First, and simplest, the battery has been removed to a warm room and allowed to stand until warm enough to charge. But, since the battery casing is a poor thermal conductor, this procedure is far too slow to be satisfactory. Attempts have also been made to apply heat to the exterior of the battery, as by external heating units, but this method is also impractical because of the low heat conductivity of the casing. Further, it has been proposed to employ an electrical resistance heater inside of the battery. However, internal heating elements are unsatisfactory because they present a difficult problem of sealing the casing where the heating element enters, the heating element occupies valuable space within the battery, and standardization of the battery is made more difficult.

Finally, it has been suggested, as seen in United States Patent 2,442,380 issued June 1, 1948, to Schrodt, Craig and Vinal, that dry batteries be heated by passing an alternating current through the battery, heat being generated because of the internal resistance of the battery.

When an alternating current is passed through a battery, some means must be employed to prevent discharging of the battery during the half cycle of the alternating current passing in the discharging direction, and for this purpose it has been suggested, as seen in the aforementioned patent, to employ a condenser or a blocking battery in series with the battery to be heated.

We have found that subjecting a cold battery to alternating current is a most practical method for heating the battery, if discharging of the battery can be prevented. Unfortunately, the use of either a blocking battery or a condenser to prevent discharging has proved impractical, particularly where storage batteries are to be heated. While use of a blocking battery is a theoretically practical solution to the problem, this does not answer for practical purposes, first because the blocking battery is too difficult to handle and maintain for many types of operation, and second because the blocking battery would itself be excessively heated when the apparatus is employed to heat a number of batteries in quick succession. Also, when storage batteries are to be heated, the substitution of a condenser for the blocking battery is not feasible, since the cost of the condenser alone would, for most applications, amount to hundreds of dollars, and the necessary power generating equipment would be too large.

Accordingly, it is a primary object of the present invention to provide a method and apparatus for heating cold batteries by passing an alternating current through the battery and preventing the battery from discharging during the alternating current half cycle which passes in the discharging direction.

Another object of the invention is to provide such a method and apparatus which is practical for field use, involves relatively inexpensive equipment, and eliminates the use of either blocking batteries or condensers.

A further object is to devise a method and apparatus for passing substantially pure alternating current, that is, an alternating current with substantially no direct current component, through a cold battery to heat the same.

Yet another object is to provide a method and apparatus for heating cold storage batteries at a relatively high rate.

A still further object is to provide a method and apparatus for heating a cold storage battery by passing through the battery an alternating current having a direct current charging component capable of continuously agitating the electrolyte of the battery to improve the heating effect.

Another object of the invention is to devise an apparatus for heating a cold storage battery by passing an alternating current through the battery, said apparatus including means for adjusting the relative magnitudes of the charging and discharging half cycles of the current passing through the battery.

A further object is to provide such an apparatus including means for continuously adjusting the relative magnitudes of the charging and discharging half cycles of the alternating current to produce a direct current charging component of increasing magnitude as the temperature of the battery increases.

Another object is to provide such an apparatus including means for automatically terminating heating of the battery when the internal temperature thereof has reached a desired value.

Yet a further object is to provide apparatus for heating and charging a cold storage battery, including means for automatically commencing charging when the internal temperature of the battery has reached a value at which the battery will accept a charge.

Still another object of the invention is to provide an apparatus for passing an alternating current through a cold storage battery, said apparatus including parallel circuit means for isolating the charging and discharging half cycles of the alternating current, and means responsive to the internal temperature of the battery for automatically converting the parallel circuit means to a half wave charging circuit.

In order that the foregoing and other novel features of the invention may be readily understood, reference is had to the accompanying drawings, which form a part of this specification, and wherein:

Figs. 1 and 2 are graphs showing alternating current voltages to illustrate the operation of our novel heating method;

Figs. 3 and 4 are graphs showing the periodic nature of alternating current flowing through a battery being heated by our novel method;

Fig. 5 is a graph illustrating the result of five typical heating runs made on storage batteries in accordance with the present invention;

Fig. 6 is a schematic diagram of one preferred form of heating circuit embodying the present invention;

Fig. 6a is a schematic diagram of a preferred modification of the heating circuit shown in Fig. 6;

Fig. 7 is a schematic diagram similar to Fig. 6, illustrating a modified form of the apparatus, and Fig. 8 is a schematic diagram illustrating an apparatus embodying the invention and useful for both heating and charging a battery.

We have found that substantially the sole effect of passing a pure alternating current through a storage battery is to generate heat within the battery. When such an alternating current is passed through a conventional lead-acid storage battery, there is no polarization, and accordingly, no gassing, for the reason that polarization does not build up instantaneously when the current is applied, and the direction of current flow has therefore reversed before any effective polarization occurs. The frequency of the alternating current can be varied, the limits being determined by the polarization rate of the battery being treated.

The electrolyte resistance of a conventional lead-acid storage battery at —40° F. is approximately six to seven times that of the resistance of the same battery at room temperature (75° F.), and a given alternating current will thus generate about six to seven times as much heat within a given battery at —40° F. as would be generated in the same battery at room temperature. For example, we have found that when a pure alternating current of 100 amperes is passed through a conventional 100 ampere hour automotive type lead-acid battery at room temperature, approximately 25–30 watts of power is dissipated in the battery, while the power dissipation for the same current when the battery is at —40° F. is approximately 150–175 watts. It is thus seen that an alternating current can be used to great advantage for heating purposes, since it takes advantage of the higher resistance characteristics of cold batteries, without gassing or effects other than generation of heat.

It is obvious, however, that merely passing an alternating current through the battery, whether a dry battery or a secondary battery, will result in discharging the battery while the heating process is carried out. This is because the alternating current voltage is opposed to the battery voltage during one half cycle, hereinafter referred to as the charging half cycle, and is aided by the battery voltage during the other half cycle, hereinafter referred to as the discharging half cycle. In other words, if an alternating current source is connected directly to a battery, the alternating current passing through the battery will be characterized by pulses in the charging direction which are of less magnitude than the pulses in the discharging direction. Such an alternating current is said to have a direct current discharging component.

According to the method of the present invention, we connect the battery to be heated to a source of alternating current, thus establishing a current flowing through the battery the charging half cycles of which consist of the alternating current minus the battery current and the discharging half cycles of which consist of the alternating current plus the battery current, then adjust the relative magnitudes of the charging and discharging half cycles until substantially no effective direct current discharging component exists, and continue to apply such adjusted current to the battery to heat the same, without attendant battery discharge, until the desired temperature is reached. We have found that a slight direct current discharging component is not harmful, and, as will be hereinafter explained, a direct current charging component of as much as 10 amperes is not only allowable but also helpful. As a general rule, for very low temperatures, the relative magnitudes of the charging and discharging half cycles must be so adjusted that any direct current component is within the range of from 10 amperes discharging to 10 amperes charging.

The method will be clear from a consideration of Figs. 1–3. In Fig. 1, the solid curve represents the voltage for one complete cycle of a pure alternating current, while the dotted line represents the continuous direct current voltage of the battery. It will be noted that in half cycle $a$ the battery voltage opposes the alternating current voltage, while in half cycle $b$ the battery voltage aids the alternating current voltage. Thus, as seen in Fig. 2, the effect is to shift the line of zero net voltage to the level of the battery voltage, resulting in an alternating or periodic voltage in which half cycle $b$ is of greater magnitude than half cycle $a$. The wave form shown in Fig. 2 is that which results from simply connecting an alternating current generator, for example, across the battery, employing no other circuit components, and would result in discharging the battery. In accordance with the present invention, we are able to adjust the relative magnitudes of the charging and discharging half cycles, so that neither current pulse nor half cycle predominates, or so that the current pulse or half cycle in the charging direction predominates, if desired. For example, in Fig. 3, there is shown one current wave form resulting after the pulses are adjusted, and it will be seen that, though the discharging current pulse is longer in duration than the charging pulse, it is smaller in amplitude. The charging and discharging half cycles can be relatively so adjusted that the time integrals of the instantaneous current values in each half cycle are equal, as indicated by the solid line in Fig. 3, or the amplitude of the discharging half cycle can be further reduced, as indicated by the dotted line in Fig. 3, so as to make the charging current pulse or half cycle predominate.

As previously mentioned, assuming that a storage battery is being treated and the frequency of the alternating current employed is sufficiently high, there will be no polarization or gassing when the charging and discharging half cycles of current are substantially equal. It has been found to be advantageous under some circumstances in the heating of storage batteries, however, to make the charging pulses predominate, that is, to employ a small direct current charging component.

Results of actual practice of the heating method just described will be seen in Fig. 5, wherein curves for heating runs made on several different storage batteries, representing electrolyte temperature as a function of time, are shown. Data for the curves are as follows:

| Btty. No. | A. C. Amps. | D.C. Amps. Charging Component | Sp. Gr. | Battery Rating in Amp.-Hrs. |
|---|---|---|---|---|
| 1 | 180 | 0 | 1.250 | 155 |
| 2 | 170 | 10 | 1.250 | 155 |
| 3 | 180 | 0 | 1.175 | 100 |
| 4 | 300 | 0 | 1.250 | 110 |
| 5 | 300 | 0 | 1.250 | 110 |

It will be noted that the heating time required varies directly with the battery size, and that the progress of temperature with time is substantially uniform.

It will also be noted that batteries No. 1 and No. 2 were identical in size and specific gravity of electrolyte, but that the presence of a 10 ampere direct current charging component in the alternating current passing through battery No. 2 apparently provides a more rapid increase in temperature. Of course, at temperatures on the order of $-30°$ F., a direct current charging component has substantially no effect in charging the battery, since the battery will not accept a charge electro-chemically at such temperatures. The effect of the direct current charging component is to disassociate the water molecules of the electrolyte into hydrogen and oxygen, causing the electrolyte to be agitated, and the heat resulting from passage of current through the battery to be more thoroughly distributed through the battery. At very low temperatures, even a small direct current will cause considerable gassing, and care must therefore be taken that the charging component is not so great as to cause the electrolyte to be agitated so vigorously as to boil over and escape from the battery.

The method of the present invention may be carried out by connecting the battery to a source of alternating current, and connecting in series with the battery an asymmetric conductive device which presents a greater impedance to the discharging half cycle of alternating current than to the charging cycle. The asymmetry of the device is chosen or adjusted to provide the desired relative magnitude of the charging and discharging half-cycles. The asymmetric conductive device may be a saturable reactor of the type hereinafter described, or any other suitable asymmetric impedance. The method may also be carried out by isolating the charging half cycles from the discharging half cycles of the alternating current, so that the discharging half cycles may be subjected to a greater impedance than the charging half cycles. For this purpose, we prefer to employ an apparatus including a heating circuit for connecting the battery across a source of alternating current, a portion of the heating circuit in series with the battery being divided into two parallel branches, a pair of unidirectional conducting elements arranged one in each of said branches and in opposition to each other, whereby the charging half cycle of current from the alternating current source may flow in only one of said branches, and the half cycle of current in the discharge direction may flow only in the other of said branches, and an impedance in series in said other branch. Though any type of alternating current impedance will function in the apparatus, we prefer to employ an inductive impedance, i. e., a choke coil.

As seen in Fig. 6, one simple embodiment of the apparatus comprises a transformer 1 having a primary winding 2 and a secondary winding 3, the primary being connected to any suitable source of alternating current by the supply conductors 4 and 5. The battery 6 to be heated is connected across the secondary of the transformer by a conductor 7 and two parallel branch conductors 8 and 9. The parallel branch 8 includes a half wave rectifier 10 connected to pass current only in the charging direction, that is, in opposition to the battery voltage. The parallel branch 9 includes a half wave rectifier 11 connected in opposition to the rectifier 10, that is, to pass current only in the discharging direction. Thus, the rectifiers 10 and 11 are arranged one in each of the parallel branches and in opposition to each other. Connected in series with the rectifier 11 in the branch 9 are a choke 12 and a switch 13. In operation of the apparatus, with the leads 4 and 5 connected to a source of alternating current, the charging current pulse or half cycle passed by the rectifier 10 depends upon the voltage $a$, Fig. 2, and the resistance of the circuit components including the battery 6 and the rectifier 10. The discharging current pulse or half cycle passed by the rectifier 11 is determined by the larger voltage $b$, Fig. 2, and the resistance of the battery 6 and the rectifier plus the impedance of the choke 12. Thus, the added choke 12 in the branch 9 is employed to reduce the discharging current, in order to obtain the adjusted wave form shown in Fig. 3. Though the voltage in the half cycle tending to discharge the battery is considerably greater than the voltage effective in the charging half cycle, the discharge current pulse, being reduced by the choke 12, is of considerably smaller amplitude than the charging current pulse.

Though the choke 12 can be so chosen that the time integrals of the instantaneous current values in the charging and discharging half cycles are substantially equal, in some cases the power factor of the circuit may then be inadequate because of the relatively high inductance necessary in the choke. Therefore, we prefer, in some cases to employ a choke of lower inductance, compensating for the lower inductance by proper choice of the rectifiers, as will now be described with reference to Fig. 6a.

All dry plate rectifiers possess a characteristic referred to as the "threshold voltage," which may be defined as the advance voltage which must be applied across the rectifier before the rectifier will pass current in the advance direction. For selenium rectifiers, the threshold voltage is about 0.2 volts per junction, while for magnesium copper sulfide rectifiers it is about 0.5 volts per junction. The threshold voltage is a variable characteristic, decreasing immediately when current begins to flow through the rectifier and increasing again after current ceases to flow. For example, the threshold voltage for a single junction copper sulfide rectifier is about 0.6 volts before conduction takes place, and after conduction drops to about 0.4 volts. Distinct from the threshold voltage, the characteristic ability of a dry plate rectifier to pass no current in the reverse direction is referred to as the "blocking voltage." The blocking voltage for a single junction copper sulfide rectifier is on the order of 5.5 volts, while the blocking voltage for a single junction selenium rectifier is on the order of 26–30 volts. Thus, for example, when a 6-volt, 3-cell, lead-acid automotive storage battery is connected in the circuit as shown in Fig. 6a, only one series junction of the selenium rectifier would be needed to block the inverse voltage, while four to five series junctions of the magnesium copper sulfide rectifier would be needed. Finally, the resistance of a copper sulfide rectifier, on a per-junction basis, is only about one-third that of a selenium rectifier.

As shown in Fig. 6a, we prefer to employ a selenium rectifier as the rectifier 10, and a magnesium copper sulfide rectifier as the rectifier 11, the magnesium copper sulfide rectifier having sufficient series junctions that its threshold voltage characteristic is just sufficient to prevent passage of current in the discharge direction when only the battery voltage alone is present. Then, as the alternating current voltage increases in the discharge half cycle, the discharge current pulse which is allowed to flow by the rectifier 11 increases from zero, rather than from the steady battery discharge current which would be flowing were it not for the high threshold voltage characteristic of the rectifier 11. Since fewer junctions of the selenium rectifier 10 are employed, the effect of the threshold characteristic of that rectifier during the charging half cycle is relatively small, and the resulting wave form for the current is thus on the order of that shown in Fig. 4. Since the resistance of the copper sulfide rectifier is low as compared, junction for junction, to that of the selenium rectifier in the charging branch, the primary function of the copper sulfide rectifier, with its higher threshold voltage, is to reduce the length of the discharge half cycle, and the choke 11 must ordinarily still be employed to limit the discharge current.

A subsidiary function of the high threshold voltage rectifier 11 is to prevent the battery from discharging during such time as the battery is connected in circuit but the alternating current source has not been turned on. Also, in this connection we may provide a switch 13, Figs. 6 and 6a, in the discharge branch 9, so that the switch may be opened to prevent any discharge of the battery after the alternating current has been interrupted.

The apparatus also preferably includes a time switch for breaking the alternating current supply circuit after a predetermined time, to terminate the heating operation. Any conventional time switch may be employed, and in Fig. 6 we have illustrated a switch 14 in the power lead 4, this switch being actuated through a suitable clockwork by a synchronous motor 15 connected across power leads 4 and 5 by conductors 16 and 17. Such arrangements are well known in the art, and it will be understood that the switch is manually closed and automatically opened by the motor-driven clockwork after elapse of a predetermined time. If desired, the time switch shown in Fig. 6 may be replaced by a thermally responsive device operable to interrupt the alternating current supply in response to occurrence of a predetermined internal temperature of the battery being heated, as will be apparent from the later description of Fig. 8.

The impedance 12 may be adjustable, comprising, for example, a choke coil having a plurality of taps as shown in Fig. 6. Alternatively, the core of the choke may be provided with an adjustable air gap as shown in Fig. 6ª. In setting up the apparatus, an alternating current meter and a direct current meter are connected in series with the battery, the supply voltage is then adjusted, as by means of a tap switch on the transformer 1, to give the desired alternating current value, and the value of the impedance 12 is so selected that no direct current reading is obtained.

In Fig. 7, we have shown the heating circuit as previously described, but in combination with means for progressively varying the alternating current supply voltage so as to progressively increase the relative magnitude of the charging half cycle of the heating current as compared to the discharging half cycle. Thus, the primary winding 2 of the transformer 1 is provided with a plurality of taps embodied in the tap switch 18. The tap switch 18 includes a rotary contact 19 driven by a synchronous motor 20, the motor 20 being connected across the power leads 4 and 5 by conductors 21 and 22. As in the case of the apparatus shown in Fig. 6, the choke 12, Fig. 7, is selected to obtain a ratio of impedance between the charging and discharging branches 8 and 9 such that, for the initial alternating current supply voltage, there is substantially no direct current component in the heating current. Then, as heating progresses, the motor 20 operates to rotate the contact 19 of the tap switch in a direction to increase the alternating current voltage applied to the battery. The motor 20, of course, operates through suitable clockwork (not shown), and the result is a progressive, stepwise change of the alternating current voltage. The tap switch may be provided with a final blank contact to afford an off position at the end of the heating and charging operation.

As will be understood from the previous discussion of Figs. 1–3, progressively increasing the alternating current voltage applied to the battery will result in a progressive predominance of the charging half cycle of the heating current. Thus, with the apparatus of Fig. 7, as the internal temperature of the battery increases, there is provided a progressively increasing direct current charging component. As has been pointed out, the presence of a small charging component during heating is advantageous in that it causes agitation of the battery electrolyte and thus spreads the heat more thoroughly through the battery. The permissible magnitude of the charging component increases with the temperature of the battery, and the apparatus of Fig. 7, thus makes possible a more efficient cycle by automatically increasing the direct current charging component as the battery temperature increases. Also, it will be understood that, as the battery temperature increases, a temperature will eventually be reached at which the battery will accept a charge electrochemically, and the apparatus of Fig. 7 thus provides for an automatic progressive shift from heating to charging.

In Fig. 8, we have shown the heating circuit previously described combined with thermally responsive means for automatically converting the heating circuit to a half wave charging circuit upon occurrence of a predetermined temperature in the battery. In this embodiment of the invention, there are provided two relays 26 and 27, the windings 28 and 29, respectively, thereof being connected in parallel across the alternating current supply leads 4 and 5 by the conductors 30, 31, 32 and 33, as shown, so that the two relays may be simultaneously energized from the alternating current source which powers the heating circuit. The relay 26 is provided with normally open contacts in the discharge branch 9 of the heating circuit, so that this circuit can operate to heat the battery 6 only when the relay 26 is held closed during energization of its actuating winding 28. The relay 27 operates as a tap switch for the transformer 1, its movable contact being normally biased to a position in which a maximum number of turns of the primary are included in the circuit. When the actuating winding 29 of the relay 27 is energized, the movable contact of that relay is actuated to a position in which fewer turns of the primary are included in the circuit.

Controlling the actuating circuit for the relays 26 and 27 is a third relay 34 having contacts 35 in the conductor 32, a movable contact normally biased out of engagement with the contacts 35, as by means of spring 37, and an actuating winding 38. The actuating winding 38 of the relay 34 is connected in the plate circuit of a thyratron or like electron discharge tube 39, the tube being controlled by a Wheatstone bridge 40 including in one arm thermistor $R_t$ inserted in the battery 6. The thermistor-bridge-thyratron circuit, and its operation in controlling the relay 34, is fully disclosed in United States Patent 2,529,038, issued on November 7, 1950, to James B. Godshalk and Lewis A. Medlar. The bridge 40 and tube 39 are activated by a transformer 41, the primary winding 42 of which is connected across the alternating current supply leads 4 and 5 by conductors 30, 31 and 43.

It will be noted that the cathode and grid of the tube 39 are connected across the galvanometer points of the bridge 40, so that conductivity of the tube, and thus energization of the winding 38 of the relay 34, is controlled by the balance or unbalance of the bridge 40. The circuit is so designed, as fully explained in aforementioned Patent 2,529,038, that the bridge 40 is unbalanced in a sense causing tube 39 to be conductive, and relay winding 38 thus to be energized, only so long as the thermistor $R_t$ is at a temperature below a predetermined value, the value in this instance being the temperature at which it is desired to terminate heating and commence charging of the battery 6. When the temperature of the thermistor reaches this value, the bridge is balanced, the tube 39 becomes non-conductive, and the relay winding 38 is de-energized. The thermally responsive circuit is provided with an automatic lock-out arrangement, including an unbalancing resistance 44 and a normally closed push-button switch 45, the arrangement being such that, when the tube 39 becomes non-conductive, as when the bridge 40 is balanced by an increasing temperature of the thermistor, and the relay 34 is relaxed, the unbalancing resistance 44 is connected into the bridge 40 to unbalance the same in a sense causing the tube 39 to remain non-conductive until the resistance 44 is removed from the bridge by opening the push-button switch 45.

Independent switches 46 and 47 are provided in the power leads 4 and 5, respectively. Operation of the apparatus is as follows: The switch 46 is first closed, allowing the thermistor-bridge-thyratron circuit to warm up but preventing current flow in the remainder of the apparatus. When the control circuit is thoroughly warm, switch 47 is closed and push-button switch 45 is simultaneously opened to remove the lock-out resistor 44 from the bridge circuit. The battery 6 and thermistor $R_t$ being cold, the bridge 40 is unbalanced in a sense causing tube 39 to be conductive, and the relay 34 is thus actuated to close contacts 35, thus energizing windings 28 and 29 of the relays 26 and 27. Relay 26 is thus actuated to complete the discharge branch 9 of the heating circuit and, switches 46 and 47 both being closed, alternating current is thus allowed to flow in the heating circuit to heat the battery 6 as previously explained with reference to Fig. 6. Energization of winding 29 actuates relay 27 to reduce the number of turns of the transformer primary winding included in the circuit, establishing a relatively higher secondary voltage.

When, because of the operation of the heating circuit, the temperature of the battery 6 has increased to the predetermined value at which the thermistor-bridge-thyratron circuit has been designed to act, the bridge 40 balances to cause tube 39 to become non-conductive, deenergizing winding 36 of the relay 34 and thus allowing the relay to open. Opening of the relay 34 simultaneously deenergizes the windings 28 and 29 of the relays 26 and 27. Deenergizing the winding 26 causes the relay 28 to interrupt the discharge branch 9 of the heating circuit, thus converting the heating circuit to a half-wave slow charging circuit comprising secondary winding 3, conductors 7 and 8, rectifier 10, and the battery 6. Relaxation of the relay 27 results in increasing the number of turns of the transformer primary included in the supply circuit, thus establishing the desired lower secondary voltage for charging. Charging is terminated by manually opening one of the switches 46, 47.

The apparatus shown in Fig. 8 is specially designed to shift automatically from heating to slow charging. It will be understood, however, that the tap switch relay 27 may be omitted, so that the full supply is employed for charging as well as heating. For example, if a heating current of approximately 300 amperes is employed, such an alternating current being suitable for raising the temperature of a 6-volt storage battery at about 5° F. per minute, then merely interrupting the discharge branch 9 will serve to supply a charging current of about 80–100 amperes.

It will be noted that with both the apparatus of Figs. 6–8, the battery can be heated by establishing in the heating circuit an alternating current, the charging half cycles of which consist of the alternating current minus the battery current and the discharging half cycles of which consist of the alternating current plus the battery current, adjusting the relative magnitudes of the charging and discharging half cycles to obtain a direct current component in the range of 10 amperes discharging to 10 amperes charging, and then continuing to apply the adjusted alternating current to the battery until the desired battery temperature is reached.

We claim:

1. In combination in an apparatus for heating a cold battery, a circuit for connecting the battery across a source of alternating current, a portion of said circuit in series with the battery being divided into two parallel branches, and a pair of unidirectional conducting elements arranged one in each of said branches and in opposition to each other, whereby the half cycle of the alternating current from said source tending to charge the battery may pass only through a first one of said branches and the half cycle tending to discharge the battery may pass only through a second one of said branches, said second branch presenting a materially greater impedance than said first branch.

2. In combination in an apparatus of the type described, a circuit for connecting a load across a source of alternating current, a portion of said circuit in series with the load being divided into two parallel branches, a pair of unidirectional conducting elements arranged one in each of said branches and in opposition to each other, and an impedance in series in one of said branches.

3. In combination in an apparatus for heating a cold battery, a circuit for connecting the battery across a source of alternating current, one side of said circuit being divided into two parallel branches; a first half wave rectifier connected in one of said branches to pass only the charging half cycle of alternating current from the source; a second half wave rectifier connected in the other of said branches in opposition to said first half wave rectifier to pass current only in a direction tending to discharge the battery, and an inductive impedance in series in the branch containing said second rectifier.

4. In combination in an apparatus for heating a cold battery, a transformer having a primary winding for connection to an alternating current source and a secondary winding for connection to the battery, two parallel circuits connecting said secondary winding to the battery, a rectifier connected in one of said circuits to pass only the pulses of current from the source tending to charge the battery, and a second rectifier and an inductive impedance connected in series in the other of said circuits, said second rectifier being connected to pass only pulses of current tending to discharge the battery.

5. In combination in an apparatus for heating a cold battery, a circuit for connecting the battery across a source of alternating current, a portion of said circuit in series with the battery being divided into two parallel branches, a first half wave rectifier connected in one of said branches to pass only the charging half cycle of alternating current from the source; a second half wave rectifier connected in the other of said branches in opposition to said first half wave rectifier to pass current only in a direction tending to discharge the battery, and an impedance in series in the branch containing said second rectifier, the value of said impedance being such that the charging and discharging half cycles are substantially equal.

6. In combination in an apparatus for heating a cold battery, a circuit for connecting the battery across a source of alternating current, a portion of said circuit in series with the battery being divided into two parallel branches, a first half wave rectifier connected in one of said branches to pass only the charging half cycle of alternating current from the source; a second half wave rectifier connected in the other of said branches in opposition to said first half wave rectifier to pass current only in a direction tending to discharge the battery, and an inductive impedance in series in the branch containing said second rectifier, said second rectifier having a threshold voltage characteristic such as to be substantially non-conductive upon application of the voltage of the battery alone but conductive in the discharging direction upon application of a voltage substantially in excess of said battery voltage.

7. In combination in an apparatus for heating a cold battery, a circuit for connecting the battery across a source of alternating current, a portion of said circuit in series with the battery being divided into two parallel branches, a half wave selenium type rectifier connected in one of said branches to pass only the charging half cycle of alternating current from the source; a half wave magnesium copper sulfide type rectifier connected in the other of said branches to pass current only in a direction tending to discharge the battery, and an inductive impedance in series in the branch containing said last mentioned rectifier.

8. In combination in an apparatus for heating a cold battery, a transformer having a primary winding for connection to an alternating current source and a secondary winding for connection to the battery, two parallel circuits connecting said secondary winding to the battery, a half wave selenium rectifier connected in one of said circuits to pass only the pulses of current from the source tending to charge the battery, and a half wave magnesium copper sulfide rectifier connected in the other of said circuits to pass only the pulses of current from the source tending to discharge the battery, said magnesium copper sulfide rectifier comprising sufficient series junctions to provide a threshold voltage characteristic of sufficient magnitude to prevent current flow in the discharge direction upon application of the battery voltage alone.

9. In combination in an apparatus for heating a cold battery, a transformer; two parallel circuits for connecting the output of said transformer across the battery; a half wave rectifier and a choke connected in series in one of said circuits, said rectifier being connected to pass current only in a direction tending to discharge said battery and having a threshold voltage characteristic such as to be substantially non-conductive when the battery voltage alone is applied to said circuit, and a second half wave rectifier connected in the other of said circuits in opposition to said first mentioned rectifier.

10. In combination in an apparatus for heating a cold storage battery, a transformer including a primary winding and a secondary winding; a supply circuit for connecting said primary winding across a source of alternating current, said supply circuit including a tap switch for varying the number of turns of said primary winding which are connected across said source; two parallel circuits for connecting said secondary winding to the battery; a half wave rectifier and a choke connected in series in one of said parallel circuits, said rectifier being connected to pass current only in a direction tending to discharge the battery; a second half wave rectifier connected in the other of said circuits in opposition to said first mentioned rectifier, and means for progressively adjusting said tap switch as the temperature of the battery increases.

11. In combination in an apparatus for heating and charging a cold storage battery, a circuit for connecting the battery across a source of alternating current, a portion of said circuit in series with the battery being divided into two parallel branches, a pair of unidirectional conducting elements arranged one in each of said branches and in opposition to each other, whereby the half cycle of alternating current from said source tending to charge the battery may pass only through one of said branches and current tending to discharge the battery may pass only through the other of said branches, and a choke and a contactor in series in said other branch.

12. In combination in an apparatus for heating and charging a cold storage battery, a circuit for connecting the battery across a source of alternating current, a portion of said circuit in series with the battery being divided into two parallel branches; a pair of half wave rectifiers arranged one in each of said branches and in opposition to each other, whereby the half cycle of the alternating current from said source tending to charge the battery may pass only through one of said branches and current tending to discharge the battery may pass only through the other of said branches; thermally responsive means subjected to the internal temperature of the battery; a contactor in series in said other branch, and electrical means controlled by said thermally responsive means for operating said contactor to interrupt said other branch, thereby converting said circuit to a half wave charging circuit, upon occurrence of a predetermined battery temperature.

13. In combination in an apparatus for heating and charging a cold storage battery, a transformer having a primary winding and a secondary winding; two parallel circuits for connecting the secondary winding of said transformer across the battery; a half wave rectifier and a choke connected in series in a first one of said circuits, said rectifier being connected to pass current only in a direction tending to discharge said battery; a half wave rectifier connected in the other of said circuits in opposition to said first mentioned rectifier; a contactor in said first circuit; switching means for reducing the effective number of turns of said primary winding; thermally responsive means subjected to the internal temperature of the battery, and a circuit responsive to a predetermined temperature in said thermally responsive means for simultaneously opening said contactor to prevent current flow in said first circuit and operating said switching means to reduce the current from said transformer, when rectified by said last mentioned half wave rectifier, for charging the battery.

14. In combination, an alternating current supply, a storage battery, two parallel circuits for connecting said battery to said supply, one of said circuits being electrically conductive only in a direction tending to charge said battery and the other of said circuits being electrically conductive only in a direction tending to discharge said battery, and electrical means responsive to the occurrence of a predetermined internal temperature of said battery for interrupting said other circuit.

15. The method of heating a cold battery comprising connecting the battery to a source of alternating current, thereby establishing an alternating current passing through the battery the charging half cycle of which consists of the alternating current minus the battery current and the discharging half cycle of which consists of the alternating current plus the battery current, adjusting the relative magnitudes of the charging and discharging half cycles until no effective direct current discharging component exists, and then continuing to apply said alternating current until the internal temperature of the battery reaches the desired value.

16. The method of heating a cold battery comprising connecting the battery to a source of alternating current, thereby establishing an alternating current passing through the battery the charging half cycle of which consists of the alternating current minus the battery current and the discharging half cycle of which consists of the alternating current plus the battery current, adjusting the relative magnitudes of the charging and discharging half cycles until the time integral of the instantaneous value of current flowing in the discharging half cycle is substantially equal to the time integral of the instantaneous values of the current flowing in the charging half cycle, and then continuing to apply said alternating current until the internal temperature of the battery reaches the desired value.

17. The method of heating a substantially charged but exceptionally cold storage battery comprising connecting the battery to a source of alternating current, thereby establishing an alternating current passing through the battery the charging half cycle of which consists of the alternating current minus the battery current and the discharging half cycle of which consists of the alternating current plus the battery current, adjusting the relative magnitudes of the charging and discharging half cycles until the direct current discharging component of the current passing through the battery is limited to a value which will not discharge the battery beyond use during the time period necessary to heat the battery, and then continuing to apply said alternating current until the internal temperature of the battery reaches the desired value.

18. The method of heating a cold storage battery comprising connecting the battery to a source of alternating current, thereby establishing an alternating current passing through the battery the charging half cycle of which consists of the alternating current minus the battery current and the discharging half cycle of which consists of the alternating current plus the battery current, adjusting the relative magnitudes of the charging and discharging half cycles until there is obtained a direct current charging component of such magnitude as to agitate the electrolyte of the battery without causing said electrolyte to boil over, and continuing to apply such alternating current until the internal temperature of the battery reaches the desired value.

19. The method of heating a cold storage battery comprising connecting the battery to a source of alternating current, thereby establishing an alternating current passing through the battery the charging half cycles of which consist of the alternating current minus the battery current and the discharging cycles of which consist of the alternating current plus the battery current, adjusting the relative magnitudes of the charging and discharging half cycles to obtain a direct current component in the range of from 10 amperes discharging to 10 amperes charging, and then continuing to apply said alternating current until the internal temperature of the battery reaches the desired value.

References Cited in the file of this patent

UNITED STATES PATENTS

| Number | Name | Date |
|---|---|---|
| 732,616 | Burgess et al. | June 30, 1903 |
| 1,362,844 | Cardoza | Dec. 21, 1920 |
| 1,424,731 | Linebarger | Aug. 1, 1922 |
| 1,457,863 | Strawmyer et al. | June 5, 1923 |
| 1,602,559 | Strawmyer | Oct. 12, 1926 |
| 2,022,874 | West | Dec. 3, 1935 |
| 2,347,452 | Amsden | Apr. 25, 1944 |
| 2,354,877 | Peters | Aug. 1, 1944 |
| 2,442,380 | Schrodt et al. | June 1, 1948 |
| 2,499,663 | Medlar | Mar. 7, 1950 |
| 2,503,179 | Tichenor | Apr. 4, 1950 |
| 2,526,251 | Medlar | Oct. 17, 1950 |
| 2,529,038 | Medlar et al. | Nov. 7, 1950 |
| 2,550,344 | Godshalk | Apr. 24, 1951 |
| 2,585,005 | Godshalk et al. | Feb. 12, 1952 |
| 2,619,624 | Briggs, Jr. | Nov. 25, 1952 |